United States Patent [19]

Kume et al.

[11] 4,047,230
[45] Sept. 6, 1977

[54] METHOD AND APPARATUS FOR TRANSFERRING MAGNETIC SIGNAL FROM A MASTER SHEET TO COPY SHEETS

[75] Inventors: Tsutomu Kume; Kazuo Kasai; Hidefumi Kaneko; Shigeo Sugiyama; Shigeo Mithuhashi, all of Tokyo, Japan

[73] Assignee: Ricoh Co., Ltd., Tokyo, Japan

[21] Appl. No.: 745,137

[22] Filed: Nov. 26, 1976

[30] Foreign Application Priority Data

Dec. 22, 1975 Japan ............................ 50-151934

[51] Int. Cl.² .................................................. G11B 5/86
[52] U.S. Cl. ............................................................. 360/17
[58] Field of Search .................................... 360/16, 17

[56] References Cited

U.S. PATENT DOCUMENTS

| | | | |
|---|---|---|---|
| 3,665,513 | 5/1972 | Benson et al. | 360/17 |
| 3,721,775 | 3/1973 | Fujimoto et al. | 360/17 |
| 3,843,964 | 10/1974 | Fujimoto | 360/17 |

*Primary Examiner*—Robert S. Tupper
*Attorney, Agent, or Firm*—Frank J. Jordan

[57] ABSTRACT

A master sheet is coated with a magnetic layer carrying magnetic signals in, for example, a spiral magnetic recording track, and is pressed into contact with a copy sheet which is also coated with a magnetic layer. A magnetic field is applied to the sheets to transfer the magnetic signals from the master sheet to the copy sheet. The copy sheet is then separated from the master sheet by air pressure, suction or mechanical means in a direction perpendicular to the sheets and subsequently fed away from the master sheet in a direction parallel to the sheets while maintained separated from the master sheet to reduce the transfer noise level to a negligible amount.

11 Claims, 8 Drawing Figures

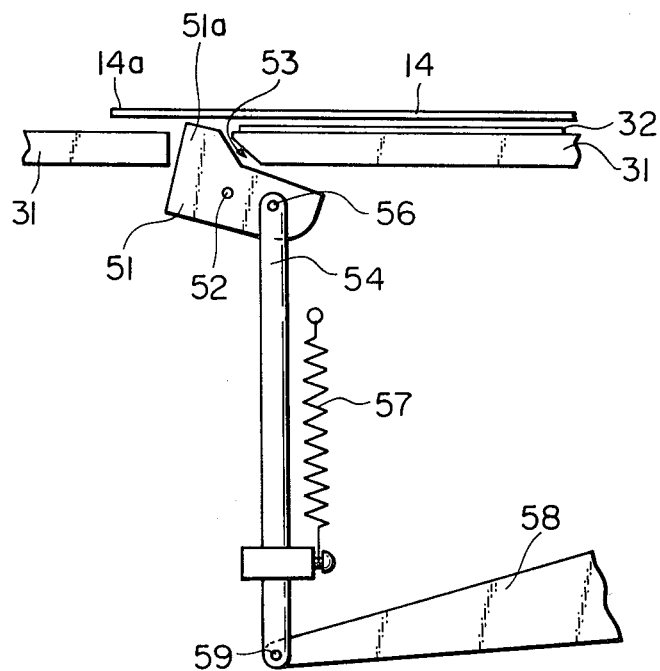
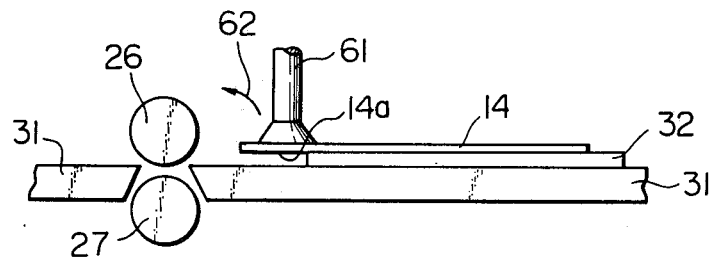

METHOD AND APPARATUS FOR TRANSFERRING MAGNETIC SIGNAL FROM A MASTER SHEET TO COPY SHEETS

BACKGROUND OF THE INVENTION

The present invention relates to a method and apparatus for transferring magnetic signals from a master sheet to copy sheets which constitutes a novel improvement over the system disclosed in U.S. Pat. No. 3,721,775 which is assigned to the same assignee as the present application.

Magnetic sheets on which information is magnetically recorded in the form of, for example, a spiral recording track, in conjunction with a magnetic reader for the sheets, constitute a system which is especially suitable for use as a teaching aid. Both video and audio signals may be recorded on the sheets, to provide, for example, a visual reproduction of a picture and an audio narrative description of the picture. Of course, the sheets may be utilized to record only video or only audio information. An advantage of the system is that the copy sheets may be produced at very low cost.

To produce the copy sheets, the video and/or audio information is magnetically recorded on a master sheet which is typically formed of a polyester substrate coated with a magnetic material such as a ferric oxide. The copy sheets are formed of a paper substrate which is also coated with a magnetic material. To transfer the magnetic signals from the master sheet to a copy sheet, the master and copy sheets are pressed together with the magnetic coating in close contact and a rotating magnetic field is applied through the plastic substrate of the master sheet. Thereafter, the copy sheet is removed from the master sheet. The copy sheet is preferably perforated to provide indexing holes simultaneously with performing the magnetic transfer.

In the apparatus heretofore employed to perform the magnetic transfer operation, the master sheet is placed on a table with the magnetic coating thereof facing upwardly. The copy sheet is then slid along the table with the magnetic coating thereof facing downwardly onto the master sheet. After the transfer operation, the copy sheet is slid over and off of the master sheet into a receiving tray and another copy sheet is slid onto the master sheet for transfer.

The problem in this system is that when the copy sheet is slid off the master sheet in contact therewith magnetic transfer continues from the master sheet to the copy sheet in such a manner as to induce magnetic signals in the coating of the copy sheet which do not constitute usable information and which appear as noise when the copy sheet is inserted in reader for reproduction of the visual and/or audio signals.

SUMMARY OF THE INVENTION

It is therefore an object of the present invention to provide method of transferring magnetic signals from a master sheet to a copy sheet which eliminates the transfer noise described hereinabove.

It is another object of the present invention to provide an apparatus embodying the method.

It is another object of the present invention to provide an apparatus for transferring magnetic signals from a master sheet to a copy sheet in which, after the sheets are pressed together and magnetic transfer is accomplished, the sheets are separated perpendicularly from each other, and the copy sheet is subsequently moved away from the master sheet parallel to the same while maintained in separation therefrom.

It is another object of the present invention to provide an apparatus for transferring magnetic signals from a master sheet to a copy sheet in which, after the sheets are pressed together and magnetic transfer is accomplished, the copy sheet is separated perpendicularly from the master sheet by air pressure, suction or mechanical force.

It is another object of the present invention to provide a generally improved method and apparatus for transferring magnetic signals from a master sheet to a copy sheet.

Other objects, together with the foregoing, are attained in the embodiments described in the following description and illustrated in the accompanying drawings.

BRIEF DESCRIPTION OF THE DRAWING

FIGS. 3a and 3b are fragmentary sectional views illustrating a second embodiment of a separating means of the apparatus in a retracted position and an actuated position respectively;

FIG. 4 is a fragmentary sectional view illustrating a third embodiment of a separating means of the apparatus;

DESCRIPTION OF THE PREFERRED EMBODIMENTS

While the magnetic signal transfer method and apparatus of the invention is susceptible of numerous physical embodiments, depending upon the environment and requirements of use, substantial numbers of the herein shown and described embodiments have been made, tested and used, and all have performed in an eminently satisfactory manner.

Figure 1:
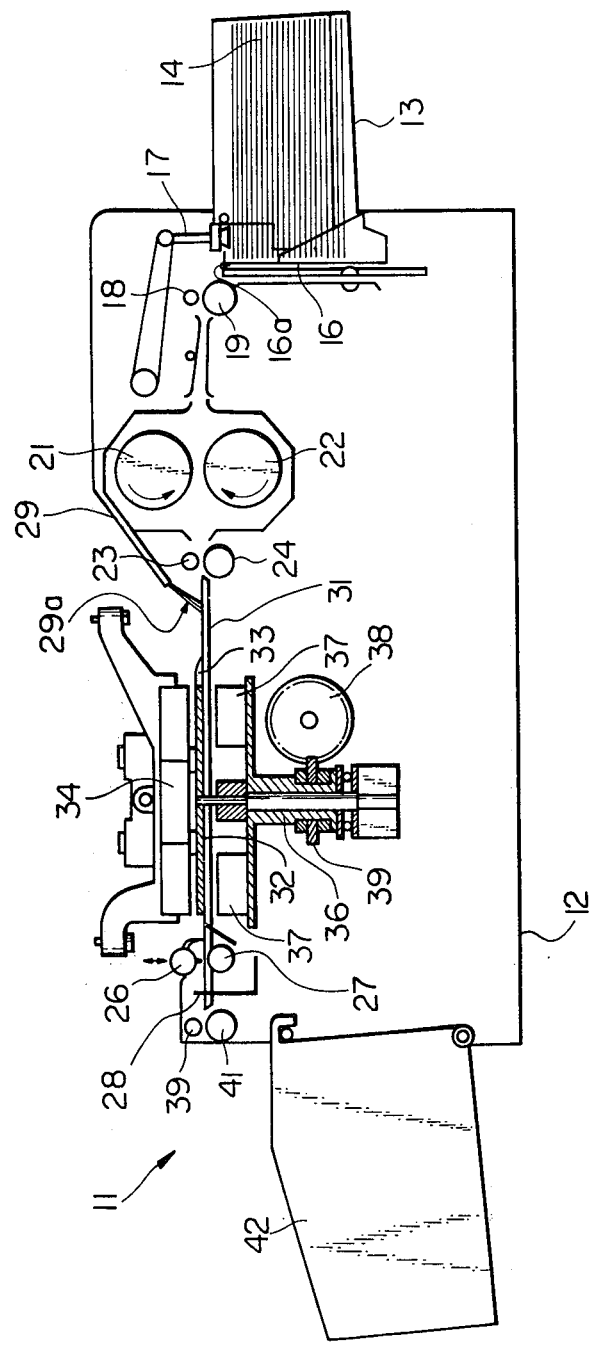
FIG. 1 is a longitudinal schematic view of a magnetic transfer apparatus of the invention.
Figure 2:
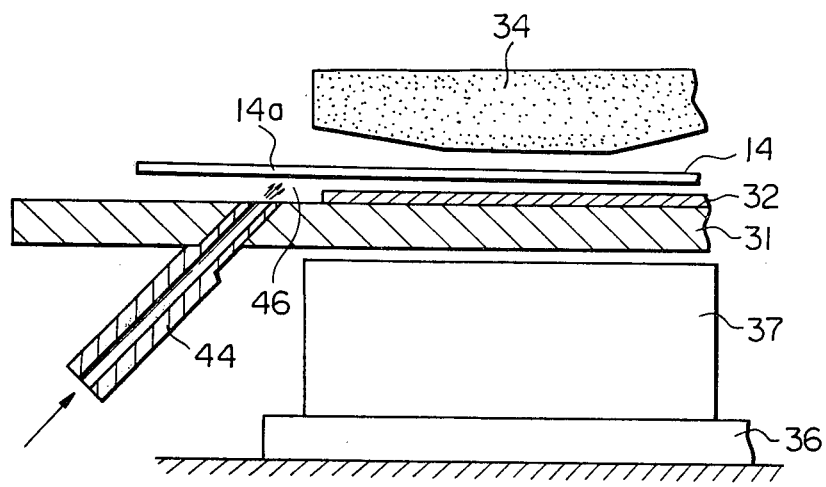
FIG. 2 is a fragmentary sectional view illustrating a first embodiment of a separating means of the apparatus.

Referring now to FIGS. 1 and 2 of the drawing, a magnetic transfer apparatus is generally designated as 11 and comprises a frame 12. An elevator table 13 is vertically movably mounted on the frame 12 which supports a stack of copy sheet 14. Each copy sheet 14 is formed of, for example, a paper substrate with a magnetic coating on one surface thereof. The copy sheets 14 are stacked on the table 13 in such a manner that the magnetic coatings thereof face downwardly. Although not shown, a sensor controlled drive means senses the position of the top copy sheet 14 and elevates the table 13 so as to maintain the top copy sheet 14 at the height of the orifice of an air nozzle 16. Although the orifice itself is not shown in the drawing, an air jet emerging rightwardly therefrom as shown and designated as 16a in FIG. 1. The air jet 16a serves to float the top copy sheet 14 upwardly from the other copy sheets 14 of the stack so that the top copy sheet 14 may be easily picked up by a suction arm 17. The suction arm 17 conveys the copy sheet 14 into the bite of feed rollers 18 and 19 which feed the copy sheet 14 leftwardly between cleaning rollers 21 and 22 which are rotated as indicated by arrows and mechanically remove bits of dust, loose paper fibers and the like from the copy sheet 14. From the cleaning rollers 21 and 22 the copy sheet 14 is gripped by feed rollers 23 and 24 which feed the copy sheet 14 leftwardly into the bite of feed rollers 26 and 27 which move the sheet 14 further leftwardly until the left edge thereof abuts against a stop 28. Another air nozzle 29 blows an air jet 29a against the copy sheet 14 to facilitate the leftward movement thereof and prevent rebound of the copy sheet 14 off the stop 28.

The feed rollers 23, 24, 26 and 27 cause the copy sheet 14 to be fed or slid over the surface of a table 31. A master sheet 32 is fixedly placed on the table 31 so that the copy sheet 14 is fed thereonto. An incline 33 having a minimum height equal to the thickness of the master sheet 32 may be provided to the right of the master sheet 32 to prevent abutment of the left edge of the copy sheet 14 with the right edge of the master sheet 32 which would prevent leftward movement of the copy sheet 14.

The master sheet 32 is typically formed of a polyester substrate with a coating of a magnetic material on one surface thereof, and is placed on the table 31 with the magnetic coating facing upwardly. Video and/or audio signals are recorded in the form of, for example, a spiral recording track of magnetic signals in the magnetic coating of the master sheet 32.

A presser 34 is vertically movably disposed above the table 31 and is actuated after the copy sheet 14 is fed into alignment above the master sheet 32, downwardly to press the copy sheet 14 against the master sheet 32. The presser 34 is preferably formed of a non-magnetic material such as stainless steel, brass or resin.

A turntable 36 is supported below the table 31 so as to be ratatable in a plane parallel to the table 31 and perpendicular to the drawing of FIG. 1. An electromagnet 37 is mounted on the turntable 36 which is energized after the presser 34 presses the copy sheet 14 against the master sheet 32. The turntable 36 is driven for rotation from a drive means (not shown) through meshing gears 38 and 39.

The rotating magnetic field of the electromagnet 37 causes transfer of the magnetic signals on the master sheet 32 to the copy sheet 14. The magnetic signals on the master sheet 32 are not, however, erased by this operation and the master sheet 32 may be used to transfer the magnetic signals to a large number of copy sheets 14.

Figure 5:
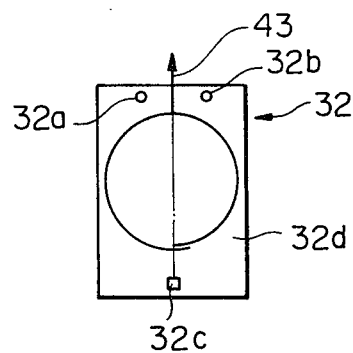
FIG. 5 is a diagram of a master sheet illustrating the cause of transfer noise.

In the method practiced heretofore, the electromagnet 37 is de-energized, the presser 34 is raised, the stop 28 is retracted and the copy sheet 14 is slid over the master sheet 32 is leftwardly by the feed rollers 26 and 27 and feed rollers 39 and 41 into a receiving tray or bucket 42. Although not shown, a punch and die punch indexing holes in the copy sheet 14 as the presser 34 is lowered. The master sheet 32 is further illustrated in FIG. 5 in which indexing perforations in the master sheet 32 are designated as 32a, 32b and 32c and the spiral recording track is designated as 32d. The direction of sliding movement of the copy sheet 14 over the master sheet 32 is designated by an arrow 43.

Figure 6:
FIG. 6 is a graph illustrating magnetic signals and transfer noise produced by prior art apparatus.

The problem in this method which has heretofore remained unsolved is that transfer of magnetic signals from the master sheet 32 to the copy sheet 14 is continued in a generally random manner as the copy sheet 14 is slid over the master sheet 32 which would appear as noise, referred to as transfer noise, upon reproduction of the magnetic signals as illustrated in the diagram of FIG. 6.

The present invention overcomes this problem in a novel manner as illustrated in detail in FIG. 2. The apparatus 11 is designed so that the left edge portion of the copy sheet 14, which is designated as 14a, extends leftwardly beyond the master sheet 32. An air nozzle 44 opens through a hole (not designated) in the table 31 toward the edge portion 14a of the copy sheet 14. After the presser 34 is raised following the transfer operation, air blown through the air nozzle 44 in a jet 46 exerts an upward force on the edge portion 14a which raises the same above the master sheet 32. The air jet 46 is thereafter free to penetrate the space which is created between the copy sheet 14 and master sheet 32 and float the copy sheet 14 above the master sheet 32, thereby separating the sheets 14 and 32 in a direction perpendicular to the surface thereof. The feed rollers 26, 27, 39 and 41 move the copy sheet 14 leftwardly, parallel to the surfaces of the sheets 14 and 32, into the bucket 42 while the air jet 46 maintains the sheets 14 and 32 separated.

Figure 7:
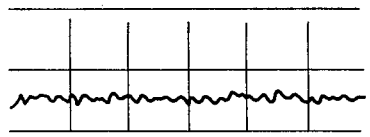
FIG. 7 is similar to FIG. 6 but illustrates how the transfer noise is substantially reduced by the present invention.

It will be understood by those skilled in the art that since sliding contact between the sheets 14 and 32 subsequent to the transfer operation is eliminated, the production of transfer noise will be substantially reduced or eliminated entirely. The improvement of magnetic transfer due to the reduction of transfer noise provided by the present invention is illustrated in the graph of FIG. 7. It is furthermore within the scope of the invention to provide an additional air jet to the right edge of the copy sheet 14 although not illustrated in the drawing.

Figure 3A:
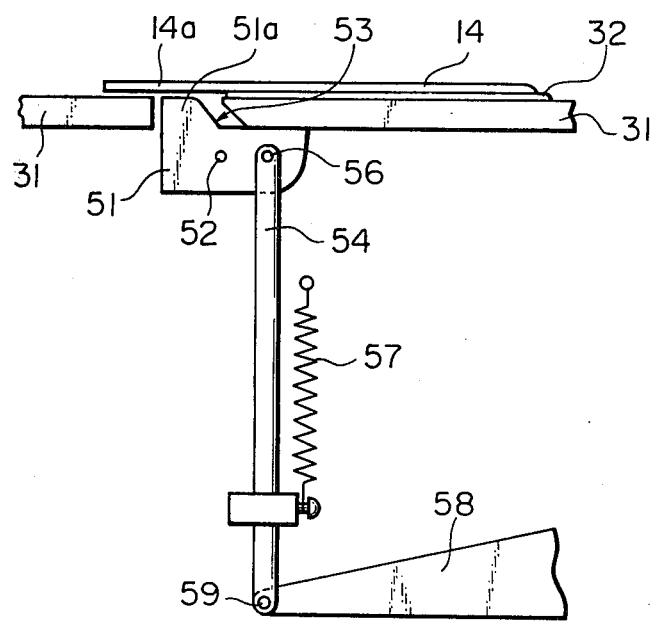

FIGS. 3a and 3b show another embodiment of the the invention in which the air nozzle 44 is replaced by a mechanical pawl 51. The pawl 51 is rotatably supported about a shaft 52 and has an engaging portion 51a which is movable between a retracted position shown in FIG. 3a to an actuated position shown in FIG. 3b in which the engaging portion 51a extends upwardly through an elongated hole 53 in the table 51. A link 54 is pivotally connected to the pawl 51 by means of a pin 56 which is disposed to the right of the pin 52. A tension spring 57 is connected between the link 54 and a fixed member (not shown) of the frame 12 so as to urge the link 54 upwardly. The force of the spring 57 is transmitted to the pawl 51 urging the same to rotate counterclockwise into abutment with the lower surface of the table 51 so that the engaging portion 51a is disposed below the upper surface of the table 51.

To actuate the pawl 51 to raise the copy sheet 14 above the master sheet 32 after a transfer operation, a drive means (not shown) moves an arm 58 which is pivotally connected to the lower end of the link 54 by a pin 59 downwardly so that the link 54 is moved downwardly against the force of the spring 57. This causes the pawl 51 to rotate clockwise so that the engaging portion 51a protrudes upwardly above the upper surface of the table 51 to engage with the edge portion 14a of the copy sheet 14 and lift the same above the master sheet 32. Since the copy sheets 14 utilized in practical application are quite stiff, the copy sheet 14, with the pawl 51 in the position of FIG. 3b, is supported at two points; by the engaging portion 51a of the pawl 51 and at the right edge of the copy sheet 14. In this manner the copy sheet 14 is separated from the master sheet 32 in a direction which is substantially upward, or parallel to the surfaces of the sheets 14 and 32. The pawl 51 is maintained in the position of FIG. 3b so that the copy sheet 14 is maintained out of contact with the master sheet 32 as the copy sheet 14 is fed leftwardly away from the master sheet 32.

FIG. 4 illustrates yet another embodiment of the present invention in which the air nozzle 44 or pawl 51 is replaced by a suction tube 61 which applies suction to the left edge portion 14a of the copy sheet 14 to separate the copy sheet 14 from the master sheet 32. Drive means (not shown) are provided to move the suction tubes 61 upwardly and leftwardly as indicated by an arrow 62 after the suction tube 61 suckingly engages the copy sheet 14 to move the copy sheet 14, while maintaining the same out of contact with the master sheet 32, into the bite of the feed rollers 26 and 27. The suction force is selected to be great enough to suckingly lift the copy sheet 14 and small enough to allow the copy sheet 14 to be moved leftwardly relative to the suction tube 61 while being suckingly lifted thereby so that copy sheet 14 is maintained above the master sheet 32 while the copy sheet 14 is being moved leftwardly by the feed rollers 26 and 27.

Many modifications will become possible for those skilled in the art after receiving the teachings of the present disclosure without departing from the scope thereof.

What is claimed is:

1. A method of transferring magnetic signals from a master sheet to a copy sheet, comprising the steps of:
   a. pressing the master and copy sheets together;
   b. applying a magnetic field to the master and copy sheets to transfer the magnetic signals from the master sheet to the copy sheet;
   c. separating the copy sheet from the master sheet in a direction substantially perpendicular to surfaces of the master and copy sheets; and
   d. moving the copy sheet away from the master sheet in a direction parallel to the surfaces of the master and copy sheets.

2. A method as in claim 1, in which step (c) comprises blowing air between the master sheet and the copy sheet.

3. A method as in claim 1, in which step (c) comprises applying mechanical force to an end portion of the copy sheet.

4. A method as in claim 1, in which step (c) comprises applying suction to an exposed portion of the copy sheet.

5. An apparatus for transferring magnetic signals from a master sheet to a copy sheet comprising:
   first feed means for feeding the copy sheet into alignment with the master sheet in a direction parallel to surfaces of the master and copy sheets;
   presser means for pressing the copy sheet against the master sheet;
   magnetic means for applying a magnetic field to the master and copy sheets to transfer the magnetic signals from the master sheet to the copy sheet;
   separator means for separating the copy sheet from the master sheet in a direction substantially perpendicular to the surfaces of the master and copy sheets; and
   second feed means for moving the separated copy sheet away from the master sheet in a direction perpendicular to the surfaces of the master and copy sheets.

6. An apparatus as in claim 5, in which the separator means comprises blower means for blowing air between the master and copy sheets.

7. An apparatus as in claim 6, in which an edge portion of the copy sheet extends beyond the master sheet, the blower means blowing air against the edge portion of the copy sheet.

8. An apparatus as in claim 5, in which the separator means comprises a mechanical member to mechanically separate the copy sheet from the master sheet.

9. An apparatus as in claim 8, in which an edge portion of the copy sheet extends beyond the master sheet, the mechanical member engaging with the edge portion of the copy sheet.

10. An apparatus as in claim 5, in which the separator means comprises suction means for applying suction to the copy sheet.

11. An apparatus as in claim 10, in which an edge portion of the copy sheet extends beyond the master sheet, the suction means applying suction to the edge portion of the copy sheet.

* * * * *